United States Patent [19]
Kennedy

[11] 4,081,590
[45] * Mar. 28, 1978

[54] CATIONIC POLYMERIZATION CATALYST

[75] Inventor: Joseph P. Kennedy, Akron, Ohio

[73] Assignee: Exxon Research & Engineering Co., Linden, N.J.

[*] Notice: The portion of the term of this patent subsequent to Jun. 14, 1994, has been disclaimed.

[21] Appl. No.: 719,850

[22] Filed: Sep. 2, 1976

Related U.S. Application Data

[62] Division of Ser. No. 221,774, Jan. 28, 1972, Pat. No. 4,029,866.

[51] Int. Cl.$^2$ .......................... C08F 4/52; C08F 36/06; C08F 36/08
[52] U.S. Cl. ................. 526/185; 252/431 R; 526/339
[58] Field of Search ..................... 526/185; 252/431 R

[56] References Cited
U.S. PATENT DOCUMENTS

| 3,123,592 | 3/1964 | Gasparoni et al. | 526/185 |
|---|---|---|---|
| 3,361,725 | 1/1968 | Parker et al. | 526/185 |
| 3,426,007 | 2/1969 | Kennedy | 526/185 |
| 3,560,458 | 2/1971 | Kennedy et al. | 526/185 |
| 3,694,377 | 9/1972 | Kennedy et al. | 526/185 |
| 4,029,866 | 6/1977 | Kennedy | 526/185 |

OTHER PUBLICATIONS

Chemical Abstracts, 62, 5337 (g), (1965).

Primary Examiner—Alan Holler
Attorney, Agent, or Firm—Richard E. Nanfeldt

[57] ABSTRACT

High molecular weight polymers and highly unsaturated polymers (e.g., butyl rubber) are prepared by homopolymerizing and copolymerizing olefins, isoolefins, conjugated multiolefins, or mixtures of isoolefins and conjugated multiolefins with a catalyst system comprising an organoaluminum compound in conjunction with a cocatalyst selected from the group consisting of sulfur dioxide, sulfur trioxide, halogens, mixed halogens and hypohalides.

9 Claims, No Drawings

CATIONIC POLYMERIZATION CATALYST

This is a division of application Ser. No. 221,774 filed Jan. 28, 1972, now U.S. Pat. No. 4,029,866.

BACKGROUND OF THE INVENTION

It is well known in the art that Friedel-Crafts catalysts may be used in conjunction with aluminum alkyls and alkyl aluminum halides to polymerize various olefins and isoolefins. For example, copolymers of 1-butene and propylene are prepared using a catalyst comprising diethyl aluminum chloride and the reaction product of titanium tetrachloride and aluminum; see, for example, U.S. Pat. No. 3,332,921, which is incorporated herein by reference.

It is known that polymers and copolymers of Type II and Type III olefins may be prepared using a catalyst comprising a Friedel-Crafts halide and an aluminum compound selected from the groups consisting of trialkyl aluminum and dialkyl aluminum halide wherein the ratio of Friedel-Crafts halide to aluminum compound is a minimum of 1; see, for example, U.S. Pat. No. 3,066,123 which is incorporated herein by reference. More recently, isobutylene has been polymerized at temperatures of about $-20°$ to $50°$ C. using a catalyst comprising aluminum compounds having the general formula $AlR_nX_{3-n}$ where R is alkyl, allyl or aralkyl, X is halogen or hydrogen, and $n$ is an integer from 1 to 3 in conjunction with vanadyl chloride. The reaction may also be carried out using a dialkyl aluminum halide or alkyl aluminum dihalide in conjunction with $SnCl_4$; see, for example, U.S. Pat. No. 3,324,094.

Finally, it is well known that aluminum dialkyl halides or aluminum hydrides alone do not initiate cationic polymerization reactions, but require the presence of large molar proportions of cocatalysts such as transition metal halides.

SUMMARY OF THE INVENTION

It has been surprisingly found that certain organoaluminums (e.g., aluminum dialkyl halides or hydrides) may be "activated" with a small amount of a cocatalyst (e.g., $SO_2$, halogens, mixed halogens and hypohalides) and the resultant composition is highly effective cationic polymerization catalyst. Moreover, it has been found that homopolymers and copolymers having higher unsaturation levels than have been achieved in the prior art are produced with the use of this novel catalyst.

THE CATALYST

The novel catalyst system of this invention comprises a certain type of organoaluminum in conjunction with a cocatalyst. The useful organoaluminums are those embraced by the formula $AlR_2X$ wherein X is a halogen or hydrogen and R is the same or different monovalent hydrocarbon radical such as $C_1$–$C_{12}$ alkyl, phenyl, $C_7$–$C_{14}$ aralkyl or $C_7$–$C_{14}$ alkaryl. Preferably, R is the same $C_2$–$C_6$ alkyl, especially ethyl, and X is chlorine. Suitable, nonlimiting examples of organoaluminums include aluminum diethyl chloride, aluminum diethyl hydride, aluminum dimethyl chloride, aluminum diisobutyl chloride, aluminum diethyl bromide, aluminum sesquichloride, aluminum diphenyl chloride, aluminum dicyclohexyl chloride and aluminum diisobutyl hydride.

The cocatalyst is selected from the group consisting of sulfur dioxide, sulfur trioxide, halogens (i.e. $F_2$, $Cl_2$, $Br_2$, $I_2$) mixed halogens (e.g. ClBr, BrF, ClF, BrI, etc.) and hypohalides (e.g. HOCl, HOBr, HOI). The molar ratio of the organoaluminum to cocatalyst is greater than 1:1, preferably greater than 2:1, especially greater than 3:1. Although the mole ratio may be as high as $10^6:1$, where a high molecular weight polymer is desired, a mole ratio range of 1000:1 to 10, particularly 100:1 to 10, is preferred. Where a high mole % unsaturation is desired, a mole ratio range of 100:1 to 2:1, particularly 10:1 to 3:1, is preferred.

THE MONOMERS

The monomers employed in conjunction with the above-described catalyst are those olefinic compounds the polymerization of which is known to be cationically initiated. Preferably, the monomers employed in connection with the above-described catalyst are those olefinic compounds conventionally used in the preparation of butyl rubber polymers, i.e. isoolefins and multiolefins.

Illustrative of the isoolefins which may be used are $C_4$ to $C_8$ compounds such as isobutylene, 2-methyl-1-butene, 3-methyl-1-butene, and 4-methyl-1-pentene. Illustrative of the multiolefins which may be used in the practice of this invention are $C_4$–$C_{14}$ conjugated diolefins such as isoprene, butadiene, 2,3-dimethyl-1,3-butadiene, 6,6-dimethyl fulvene, and piperylene. Other monomers responding to cationic polymerization are disclosed in Copolymerization, G. E. Ham, pp. 286–287, Interscience, New York, 1964, which is incorporated herein by reference.

Copolymers of these isoolefins and conjugated diolefins may also be prepared. Preferred copolymers are obtained by reacting 97.0% by weight of isoolefin such as isobutylene and about 3.0% by weight of conjugated multiolefin such as isoprene. Preferably, the isoolefin is isobutene and the conjugated multiolefin is isoprene.

Cyclodiolefin compounds such as cyclopentadiene and methyl cyclopentadiene as well as compounds such as beta-pinene and divinyl benzene may be copolymerized with the isoolefin, either in addition to the conjugated multiolefin or in place of the conjugated multiolefin. These additional cyclodiolefins may be incorporated in amounts up to about 6% by weight based on the isoolefin, preferably in amounts of 0.3 to 6.0 wt.%. In addition to the above-described butyl-type feeds, isoolefins such as isobutene may be homopolymerized or copolymerized with other polymerizable monoolefins such as styrene or styrene derivatives such as alpha-methyl styrene, p-methyl styrene or p-chlorostyrene. Furthermore, multiolefins such as butadiene and isoprene may be homopolymerized or copolymerized with other olefins of this invention. The catalyst of this invention is also effective as an initiator for the polymerization of styrene or styrene derivatives.

Where highly unsaturated butyl rubber is the desired product, the monomer feed may contain about 6 to about 25 wt.% multiolefin, e.g. 10 wt.%. The product should not contain large amounts of gel in order to have utility. The term "highly unsaturated butyl rubber" as used in the specification and claims is intended to mean butyl rubber having a viscosity average molecular weight of at least 100,000, a mole % unsaturation of at least 4%, and a gel content of not more than 5 wt.%. More preferably, these high unsaturates have a viscosity average molecular weight greater than 200,000; most preferably greater than 250,000. In these preferred embodiments, these high unsaturates have molecular weights in excess of 200,000 and mole % unsaturation of greater than 4.0%, e.g., greater than 4.5%.

The term "butyl rubber" as employed in the specification and claims, is intended to include copolymers made from a reactant mixture having therein about 70 to about 99.5% by weight of an isoolefin which has about 4–7 carbon atoms and about 30 to about 0.5% by weight of a conjugated multiolefin having about 4–14 carbon atoms. The resultant copolymers contain about 85% to about 99.5% of isoolefin and about 0.5 to 15% multiolefin. The term "butyl rubber" is described in an article by R. M. Thomas, in *Industrial Engineering and Chemistry*, Vol. 32, pp. 1282 et seq.

The term "low molecular weight butyl rubber" refers to butyl rubbers having a viscosity average molecular weight of about 5,000 to 85,000, preferably about 15,000 to about 60,000, more preferably about 25,000 to about 45,000.

THE POLYMERIZATION PROCESS

In the practice of this invention, about $10^{-1}$ to about $10^{-4}$ mole %, based on the moles of monomer to be polymerized, of the organoaluminum is used. Preferably, the organoaluminum is added to a solvent mixture of the monomer or monomers. The cocatalyst is dissolved in a suitable solvent and added slowly to the quiescent organoaluminum-monomer solution. In the practice of this invention, it is preferred that the cocatalyst be added independently although the organoaluminum can be mixed with the cocatalyst prior to the reaction. In any event, it is preferred that the cocatalyst be added either simultaneously with the organoaluminum or after addition of the organoaluminum to the monomer feed.

Any suitable solvent may be used for the monomers. Illustrative of the solvents which may be used in the practice of this invention are conventional alkyl halide solvents such as methyl chloride, chlorobenzene, methyl bromide, ethyl chloride, 1,2-dichloroethane, 1,1-dichloroethane and vinyl chloride. In addition, carbon disulfide and its analogs and homologs may be used. The preferred solvent is methyl chloride. Moreover, individual or mixtures of $C_3$ to $C_9$ saturated hydrocarbons that are liquid at the polymerization temperature may be used in the practice of this invention. These include pentane, isopentane, hexane, isooctane, methyl cyclooctane, cyclopentane, cyclohexane, methyl cyclohexane, butane, propane and isobutane.

It is preferred in the practice of this invention that at least 2 wt.%, more preferably at least 5 wt.%, of the solvent used be a polar solvent. The term "polar solvent" as used in the specification and claims means organic solvents having a dielectric constant of at least 5, more preferably at least 8. The aforementioned alkyl halide solvents are illustrative of these polar solvents. Where the polar solvent is an aromatic solvent, it should be halogen substituted on the aromatic ring. The reaction may be carried out essentially in the absence of solvent. However, where no solvent is used for the monomer mix or the major portion of the solvent is a nonpolar hydrocarbon, at least 1 wt.% of polar solvent, based on the weight of monomer, is preferably added to the reaction system.

Although a solvent is not necessary, it is preferred to employ a solvent of the type described above for the organoaluminum-monomer feed mixture and the cocatalyst. Generally, 2 to 90 wt.% of the solvent, based on the monomer feed will be employed.

The catalyst of this invention may be used at conventional polymerization temperatures, i.e., −78° to −110° C. Its advantage, however, lies in the fact that high molecular weight polymers may be prepared even at elevated temperatures and thus temperatures of +50° to −130° C. may be employed depending on the type of polymers desired. For example, high molecular weight polymers are readily prepared above −80° C. Polymers having molecular weights greater than 100,000 may be prepared at temperatures between about −10° and −100° C.; preferably these high molecular weight polymers are made at temperatures less than −20° C. The preferred range is −30° C. to about −78° C.; more preferably, about −40° C. to about −70° C.; most preferably about −40 to about −65° C., e.g., −50° C. Where low molecular weight polymers, i.e., less than 100,000, are desired, they may be prepared at higher temperatures or by using a higher multiolefin content in the feed. Preferably, both approaches are used together. These low molecular weight polymers may be prepared at temperatures between about +50° C. to about −30° C., more preferably about +20° C. to about −20° C.; most preferably about +10° C. to about −10° C.

In the practice of this invention, it is possible to produce a butyl rubber of very high molecular weight. It is known that polyisobutylene of molecular weights greater than 1,000,000 may be prepared. Due to the poisoning effect of the multiolefins (e.g., isoprene) which are ordinarily present in amounts of 2–5%, copolymers have substantially reduced molecular weight, e.g., less than 500,000. As the molecular weight is increased above this value, the mole % unsaturation is generally less than 1.3%; hence, the rate of vulcanization of these products is too slow to be of practical value. It is possible, using the catalyst of this invention, to prepare high molecular weight butyl rubber having viscosity average molecular weights greater than 500,000 and a mole % unsaturation greater than 1.3 mole %. Preferably, the viscosity average molecular weight is in excess of 500,000. More preferably the viscosity average molecular weight is in excess of 650,000 and the mole % unsaturation is greater than 1.3%. Most preferably, these polymers have a viscosity average molecular weight (g.p.c.) greater than 700,000 and a mole % unsaturation greater than 1.3%; e.g., 700,000 to about 1,400,000.

It has also been found that high molecular weight materials may be prepared at the reflux temperatures of the solvents used, e.g., −19° C. Where low molecular weight polymers are desired, i.e., polymers having molecular weights between 5,000 and 85,000, preferably 25 to 60,000, temperatures as high as +50° C. may be used. Preferably, the temperature is about +50° to about −30° C., more preferably about +30° to about −30° C., most preferably about +20° to −20° C. Under such conditions, superatmospheric pressure may be used in order to operate under self-reflux autorefrigeration conditions. The pressure used may be any pressure sufficient to maintain reflux conditions for the particular solvent monomer system at the polymerization temperature. For example, a pressure of 100 psi is adequate for the polymerization of butyl rubber using methyl chloride as the solvent. Under such conditions, the polymerization temperature is about +15° to about +40° C. Preferably, the pressure is about atmospheric to 50 atmospheres, more preferably about one atmosphere to about 10 atmospheres, e.g., 6 atmospheres. The molecular weight of the polymer may further be controlled by increasing the amount of multiolefin in the monomer mix. For example, a butyl rubber having low molecular weight, i.e., 15,000 to 30,000, may be prepared by using an isoprene content of about 6 to about 25 wt.% based on the monomer at a temperature of about 0° to 20° C.

Surprisingly, the catalyst of this invention may be used to prepare gel free copolymers of cationically initiable olefins and conjugated multiolefins having any desired weight percent conjugated multiolefin content. If preferred, homopolymers of the conjugated multiolefins, e.g., polyisoprene, may be prepared.

The polymerization reaction times (commencing with addition of the cocatalyst to the monomer-organoaluminum mixture) ranges from 1 min. to 3 hours, e.g., 3 min. - 2 hrs. and atmospheric pressures are conveniently employed. The polymers are conveniently recovered by precipitation (in some cases, addition of a non-solvent such as $CH_3OH$ may be required to cause precipitation), washed with a non-solvent such as $CH_3OH$ and dried. The polymers may be used as they are or, if desired, cured using conventional rubber curing recipes (e.g., sulfur, accelerators, fillers, carbon blacks, ZnO, stearic acid, etc.).

The following examples illustrate the advantages of this invention.

EXAMPLE 1

In a test tube were placed 10 ml. isobutylene, 10 ml. methyl chloride and 0.13 ml. $AlEt_2Cl$ at −50° C. To this quiescent solution was added dropwise a $SO_2$ in methyl chloride solution. This cocatalyst solution was prepared by dissolving 1 ml. of BaO-dried $SO_2$ in 19 ml. dry methyl chloride at −50° C. Immediately on the introduction of the $SO_2$ solution the content of the tube turned hazy then milky and soon the tube was filled with solid polymer. Ten seconds after $SO_2$ addition the reaction was quenched with methanol, the polyisobutylene recovered, washed with methanol and dried in vacuo at 50° C.; yield: 3.0 g. or 43.0% conversion. The intrinsic viscosity of the product was 1.065 corresponding to 290,500 molecular weight. Polymerization was quite vigorous as evidenced by bubbling and bumping in the tube. Consequently, the temperature during polymerization must have reached the boiling point of the mixture.

EXAMPLES 2-9

In this series of examples, isobutylene-isoprene charges were copolymerized. Two isoprene concentrations were used: 3 vol. % and 8 vol. %; and two monomer:solvent ratios were employed: 50:50 and 25:75. The total volume of the mixtures was 20 ml. with the 50:50 charges and 40 ml. with the 25:75 charges, i.e., 10 ml. of isobutylene was diluted with 30 ml. methyl chloride (25:75 charges). These charges were stirred at −50° C. in the presence of $AlEt_2Cl$. Then the $SO_2$ cocatalyst solution was added. This solution was prepared by dissolving 0.2 ml. $SO_2$ in 19 ml. methyl chloride at −50° C. The reaction conditions and results are shown in Table I.

TABLE I

| Exam. | Isoprene Vol. % | Monomer:Solvent Ratio | $AlEt_2Cl$, moles $\times 10^3$ | $SO_2$, moles $\times 10^5$ | Polymer Yield, g. | Conv., % | Int. Visc. | Mol. wt., $\times 10^{-3}$ | Unsat., Mole, % | Mol. Wt. Distrib. (Mw/Mn) |
|---|---|---|---|---|---|---|---|---|---|---|
| 2 | 3 | 50:50 | 1 | 2.2 | 2.294 | 32.7 | 0.993 | 260.1 | 1.56 | 3.64 |
| 3 | 3 | 25:75 | 1 | 2.2 | 0.624 | 8.9 | 0.821 | 193.2 | — | 2.79 |
| 4 | 3 | 50:50 | 0.5 | 2.2 | 1.357 | 19.4 | 1.137 | 321.8 | 1.40 | 4.21 |
| 5 | 3 | 25:75 | 0.5 | 2.2 | 0.715 | 10.2 | 0.944 | 239.3 | — | 3.30 |
| 6 | 8 | 50:50 | 1 | 2.2 | 0.994 | 14.2 | 3.16(?) | 1592(?) | 4.22 | — |
| 7 | 8 | 25:75 | 1 | 2.2 | 0.981 | 14.0 | 0.597 | 117.4 | 3.84 | — |
| 8 | 8 | 50:50 | 0.5 | 2.2 | 1.097 | 15.7 | 0.710 | 153.9 | 4.19 | — |
| 9 | 8 | 25:75 | 0.5 | 2.2 | 0.831 | 11.8 | 0.660 | 137.3 | — | — |

EXAMPLES 10-21

This series of examples were carried out in a manner similar to Examples 2-9, with variations in certain reaction conditions. In each of these examples, isobutylene-isoprene charges were polymerized using the reaction conditions shown in Table II. In each case, the monomers:solvent ratio was 50:50 (methyl chloride solvent), total volume of the system was 100 ml., the $SO_2$ stock solution was prepared by dissolving 1 ml. $SO_2$ in 19 ml. methyl chloride and varying amounts of this stock solution was added to the mixture of monomers, solvent and $AlEt_2Cl$. All the polymerizations proceeded smoothly with satisfactory temperature control and all the polymers produced from the reactions were high molecular weight solid rubbers. Example 19 is, in effect, a homopolymerization of isoprene and yielded a novel polyisoprene whose infrared spectra showed 85% 1,4-, 7.5% 3,4- and 7.5% 1,2-enchainment.

TABLE II

| Exam. | Isoprene, Vol. | Temp. ° C. | Time, Min. | $AlEt_2Cl$ moles $\times 10^3$ | $SO_2$, moles $\times 10^5$ | Polymer Yield, g. | Conv., % | Int. Visc. | Mol. Wt. $\times 10^{-3}$ | Unsat. Mole % | Toluene Solub. |
|---|---|---|---|---|---|---|---|---|---|---|---|
| 10 | 3 | −35 | 5 | 10 | 0.11 | 5.46 | 15.5 | 0.710 | 153.9 | 7.19 | 98.2 |
| 11 | 3 | −78 | 9.5 | 5 | 1.8 | 4.17 | 11.9 | 1.940 | 742.0 | 4.48 | 98.5 |
| 12 | 3 | −100 | 18 | 5 | 0.65 | 1.91 | 5.5 | 1.725 | 617.5 | 4.90 | 95.9 |
| 13 | 3 | −50 | 4.5 | 10 | 5.5 | 3.79 | 10.8 | 1.101 | 305.5 | 1.39 | 100 |
| 14 | 6 | −50 | 15 | 5 | 2.56 | 5.55 | 15.8 | 1.053 | 285.2 | 3.31 | 100 |
| 15 | 8 | −50 | 15 | 5 | 2.9 | 4.83 | 13.8 | 0.895 | 221.1 | 4.31 | 99.8 |
| 16 | 10 | −50 | 17.5 | 5 | 2.9 | 4.69 | 13.4 | 0.858 | 206.9 | 5.64 | 97.5 |
| 17 | 20 | −50 | 35 | 5 | 9.8 | 5.39 | 15.6 | 0.406 | 64.2 | 11.73 | 100 |
| 18 | 40 | −50 | 81 | 5 | 0.24 | 5.54 | 16.1 | 0.277 | 35.3 | 24.4 | 100 |
| 19 | 60 | −50 | 124 | 5 | 0.39 | 4.98 | 14.2 | 0.277 | 35.3 | 29.4 | 99.0 |
| 20 | 80 | −50 | 117 | 5 | 0.39 | 4.40 | 12.5 | 0.475 | 82.0 | 38.7 | 100 |
| 21 | 100 | −50 | 77 | 5 | 0.33 | 2.27 | 6.5 | — | — | — | 99.5 |

EXAMPLE 22

$Cl_2$ gas (dried over BaO) was liquefied at $-50°$ C. and diluted with methyl chloride (0.1 ml. $Cl_2$ in 10 ml. $CH_3Cl$) to form a cocatalyst solution. One drop of this solution was added to a mixture of 5 ml. isobutylene, 5 ml. $CH_3Cl$ and 0.06 ml. ($5 \times 10^{-4}$ mol) $AlEt_2Cl$ at $-50°$ C., resulting in immediate polymerization and a blob of white polymer precipitated. The yield (after washing with $CH_3OH$ and drying) was 0.51 g. (14.5% conv.) with an intrinsic viscosity of 1.762 and a molecular weight of 638,200.

This example was repeated using 0.1 ml. $AlEt_3$ (instead of the $AlEt_2Cl$) and 0.25 ml. of the cocatalyst solution, with all other conditions the same. After 17 minutes, no observable polymerization had taken place and 0.009 g. of a nonpolymeric residue was recovered, thus illustrating that aluminum trialkyls (e.g., $AlEt_3$) are not good catalysts even when "activated" by halogens such as $Cl_2$.

EXAMPLES 23–34

In this series of examples, isobutylene-isoprene copolymers were prepared using the reaction conditions set forth in Table III. In each case, 50 ml. $CH_3Cl$, 1.26 ml. $AlEt_2Cl$ (0.01 mole), 50 ml. of an isobutylene-isoprene mixture of varying proportions and the indicated quantities of $Cl_2$ cocatalyst solution were employed (the $Cl_2$ was first dried over BaO, liquefied at $-50°$ C. and diluted with 100 ml. $CH_3Cl$ to form a 0.1% solution). In all cases, polymerization occurred immediately upon addition of the cocatalyst solution. When Example 25 was repeated using $AlCl_3$ catalyst instead of the $AlEt_2Cl/Cl_2$ catalyst system, the molecular weight of the butyl rubber was only 450,000.

It will be evident to those skilled in the art that many modifications of this invention may be made without departing from the scope thereof. It is therefore not intended to limit the scope of this invention to the specific examples disclosed herein.

What is claimed is:

1. A cationic catalyst for the homopolymerization of isoolefins and copolymerization of isoolefins and conjugated dienes, said cationic catalyst formed by the reaction comprising:
   (a) an organoaluminum having the formula $AlR_2X$ wherein X is a halogen or hydrogen atom and R is the same or a different monovalent radical selected from the group consisting of $C_1$–$C_{12}$ alkyl, phenyl, $C_7$–$C_{14}$ aralkyl and $C_7$–$C_{14}$ alkaryl; and
   (b) a cocatalyst selected from the group consisting of sulfur dioxide, sulfur trioxide, mixed halogens, iodine, and hypohalides, the molar tatio of said $AlR_2X$ to said cocatalyst being greater than 1:1.

2. The catalyst of claim 1, wherein the cocatalyst is said sulfur trioxide.

3. The catalyst of claim 1, wherein the cocatalyst is said mixed halogens.

4. The catalyst of claim 3, wherein the cocatalyst is said hypohalides.

5. The catalyst of claim 1 wherein the organoaluminum is aluminum diethyl chloride, aluminum dimethyl chloride, aluminum diethyl hydride, aluminum dimethyl bromide, aluminum dibutyl chloride, aluminum diethyl iodide or mixtures thereof.

6. The catalyst of claim 1 wherein molar the ratio of organoaluminum to cocatalyst is in the range of 1000:1 to greater than 1:1.

7. The catalyst of claim 1 wherein the cocatalyst is sulfur dioxide.

8. The catalyst of claim 1 wherein the molar ratio of organoaluminum to cocatalyst is about 100:1 to about 2:1.

9. The catalyst of claim 1 wherein the molar ratio of organoaluminum to cocatalyst is about 10:1 to about 3:1.

TABLE III

Part A

| Exam. | Temp. °C. | time, Min. | Vol. % Isoprene | $AlEt_2Cl$ moles $\times 10^3$ | $Cl_2$, moles $\times 10^5$ | Yield, g. | Conv. % | Int. Visc. | Mol. Wt. $\times 10^{-3}$ | Unsat. Mole % | Toluene Solub. |
|---|---|---|---|---|---|---|---|---|---|---|---|
| 23 | −35 | 15 | 3 | 10 | 0.45 | 5.65 | 16.1 | 1.017 | 269.8 | 1.78 | 98.2 |
| 24 | −78 | 27 | 3 | 10 | 2.4 | 9.94 | 28.3 | 1.279 | 386.5 | 1.69 | 98.5 |
| 25 | −100 | 19 | 3 | 10 | 1.0 | 6.04 | 17.2 | 2.16 | 878.0 | 1.11 | 95.9 |
| 26 | −50 | 22 | 3 | 10 | 0.83 | 6.26 | 17.8 | 1.149 | 326.6 | 1.27 | 97.9 |

| Exam. | Tensile psi. | Mod. 300% psi. | Elong., % |
|---|---|---|---|
| 23 | 2226 | 589 | 730 |
| 24 | 2226 | 638 | 700 |
| 25 | 1982 | 500 | 720 |
| 26 | 1948 | 498 | 700 |

Dynamic Properties*

Part B

| Exam. | Temp. °C. | Time, Min. | Vol. % Isoprene | $AlEt_2Cl$ moles $\times 10^3$ | $Cl_2$, moles $\times 10^5$ | Yield, Conv. g. | Int. % | Wt. Visc. | Mol. Unsat. $\times 10^{-3}$ | Toluene Mole % | Solub. |
|---|---|---|---|---|---|---|---|---|---|---|---|
| 27 | −50 | 20 | 6 | 10 | 0.83 | 6.76 | 19.3 | 0.968 | 249.2 | 3.25 | 98.9 |
| 28 | −50 | 25 | 8 | 10 | 1.0 | 7.97 | 22.7 | 0.895 | 221.6 | 4.60 | 97.7 |
| 29 | −50 | 20 | 10 | 10 | 0.79 | 5.91 | 16.9 | 0.797 | 184.4 | 5.95 | 96.4 |
| 30 | −50 | 29 | 20 | 10 | 1.2 | 4.12 | 11.7 | 0.496 | 87.8 | 11.41 | 98.8 |
| 31 | −50 | 31 | 40 | 10 | 2.3 | 3.04 | 8.7 | 0.277 | 35.3 | 26.0 | 100 |
| 32 | −50 | 90 | 68 | 10 | 6.9 | 5.90 | 16.8 | 0.483 | 84.2 | 37.2 | 99.0 |
| 33 | −50 | 90 | 80 | 10 | 7.9 | 3.72 | 10.6 | 0.609 | 121.0 | 44.4 | 98.7 |
| 34 | −50 | 104 | 100 | 10 | 9.9 | 2.47 | 7.1 | — | — | — | 99.7 |

*After curing at 308° F. for 30 minutes using a recipe consisting of polymer -100 parts, HAF carbon black-50 parts, sulfur-1.5 parts, zinc oxide-5 parts, stearic acid-2 parts, tetramethyl thiuram disulfide-1 part.